(12) United States Patent
Dorris (10) Patent No.: US 7,380,769 B1
(45) Date of Patent: Jun. 3, 2008

(54) VEHICULAR CARGO LOADER

(75) Inventor: David R. Dorris, Melba, ID (US)

(73) Assignee: Ladder Lift Systems, LLC, Emmett, ID (US)

( * ) Notice: Subject to any disclaimer, the term of this patent is extended or adjusted under 35 U.S.C. 154(b) by 0 days.

(21) Appl. No.: 11/738,314

(22) Filed: Apr. 20, 2007

(51) Int. Cl.
*B66D 1/00* (2006.01)

(52) U.S. Cl. .................. 254/323; 254/325; 414/541

(58) Field of Classification Search ........... 254/323, 254/325, 328; 414/544, 522, 541, 542, 812
See application file for complete search history.

(56) References Cited

U.S. PATENT DOCUMENTS

| | | | | |
|---|---|---|---|---|
| 2,981,374 | A * | 4/1961 | Holsclaw | 187/231 |
| 3,809,256 | A | 5/1974 | Miskin | |
| 3,870,173 | A | 3/1975 | Miskin | |
| 3,876,039 | A * | 4/1975 | Bushnell, Jr. | 187/226 |
| 3,951,286 | A * | 4/1976 | Horst | 414/444 |
| 4,183,423 | A | 1/1980 | Lewis | |
| 4,329,102 | A | 5/1982 | Gray | |
| 4,597,703 | A | 7/1986 | Bartolini | |
| 5,114,120 | A * | 5/1992 | Bartelt et al. | 254/323 |
| 5,232,329 | A * | 8/1993 | Livingston | 414/494 |
| 5,294,136 | A * | 3/1994 | Dick et al. | 280/5.2 |
| 5,320,472 | A | 6/1994 | Matlack et al. | |
| 5,556,245 | A | 9/1996 | Moss | |
| 5,584,363 | A * | 12/1996 | Curtin et al. | 187/243 |
| 5,676,513 | A | 10/1997 | Bingham | |
| 5,758,481 | A | 6/1998 | Fry | |
| 5,813,814 | A | 9/1998 | Smart | |
| 5,873,694 | A | 2/1999 | Osborn, Jr. et al. | |
| 5,951,236 | A | 9/1999 | Thompson | |
| 6,247,885 | B1 | 6/2001 | Smart | |
| 6,371,449 | B1 * | 4/2002 | Chamberlain | 254/387 |
| 6,499,931 | B1 | 12/2002 | Garrett, Jr. et al. | |
| 6,644,907 | B1 * | 11/2003 | Pinder | 414/424 |
| 6,679,673 | B1 | 1/2004 | Stahler et al. | |
| 6,769,858 | B1 | 8/2004 | Butler et al. | |
| 6,921,095 | B2 * | 7/2005 | Middleby | 280/47.29 |
| 7,033,128 | B2 * | 4/2006 | Poindexter | 414/544 |
| 7,090,456 | B2 | 8/2006 | Ost et al. | |
| 2004/0018076 | A1 * | 1/2004 | Poindexter | 414/477 |
| 2004/0037674 | A1 | 2/2004 | Hadar | |

OTHER PUBLICATIONS http://www.balebuddie.com.
http://www.toolfetch.com/Category/Roofing/Platform_Hoists/?utm_source=Trafficleader&utm_medium=ppc&utm_campaign=Trafficleader.
http://www.jcwhitney.com/autoparts/Product/Pr-p_Product.CATENTRY_ID:2012815/c-10101/Nty-1/p-2012815/Ntx-mode+matchallpartial/N-10101/tf-Browse/s-10101/Ntk-AllTextSearchGroup?N.

\* cited by examiner

*Primary Examiner*—Emmanuel M Marcelo
(74) *Attorney, Agent, or Firm*—Zarian Midgley & Johnson PLLC (57) ABSTRACT

A loader device is disclosed for moving cargo to and from a vehicle roof. The loader, attached to trailers or other vehicles includes a channel, a carriage and a winch. The carriage, powered by the winch, travels up the channel to raise cargo to the vehicle roof. The carriage travels down the channel to lower cargo from the vehicle roof. Rungs attached to the channel form a ladder for human access to the vehicle roof. When not in use, the carriage folds to assume a smaller profile.

19 Claims, 7 Drawing Sheets

VEHICULAR CARGO LOADER

BACKGROUND

The present application relates generally to cargo loading and transportation systems and, more particularly, to systems and methods for loading and unloading cargo from the roofs of vehicles such as trailers, recreational vehicles, motor homes, campers, vans, trucks, sport utility vehicles, busses, boats, ships and trains.

Many people use the roof of their vehicles to haul additional cargo. Roof-top carriers are an example of this. However tall vehicles such as trailers, recreational vehicles, and busses have roofs that make lifting cargo problematic. The problem is made worse by heavier cargo such as spare tires, bicycles, animal feed and hay bales.

People have used make-shift methods such as portable step ladders or ropes to drag cargo to a vehicle roof. Others have proposed a portable boom type crane that is fitted to the vehicle roof to hoist cargo. Specialized vehicles such as garbage trucks and hay stacking machinery use elaborate mechanisms adapted specifically to the lifting of a particular type of load such as a garbage can or hay bale.

However, such methods and devices have their own disadvantages. For example, a portable step ladder requires a least one person to be able to lift the load himself while climbing the ladder. This invites accidents. A rope also requires a person to pull up a heavy load again risking injury. A boom type crane typically needs to be taken off of the vehicle roof or at least stowed while the vehicle is in transit. All of these methods then need to be set up again to unload the cargo once the vehicle reaches its destination.

Specialized vehicles are typically adapted to loading a limited range of cargo types and many times are not even suited to unloading. For example, garbage trucks may be adapted to empty individual garbage cans, but they are typically not adapted to the storage and transportation of garbage cans. Similarly, an agricultural hay stacker can pick up, store and transport individual hay bales, but is not suitable for the unloading of individual bales once they are picked up.

SUMMARY

The present application addresses the above-mentioned drawbacks associated with existing cargo loading and transportation systems. The application describes a vehicular cargo loader that can easily load and unload a variety of cargo onto or from virtually any vehicle roof. The vehicular cargo loader advantageously reduces the human effort and risk required to load and unload cargo and does not involve excessive set up and tear down.

In one embodiment, a vehicle with a vehicular cargo loader comprises a channel attached to the vehicle and a carriage slideably engaging the channel. The vehicle further comprises a winch attached to the carriage to move the carriage along the channel and rungs attached to the channel to form a ladder.

In another embodiment, a method is provided for transporting cargo on a vehicle roof. The method comprises providing a vehicular cargo loader attached to the vehicle, the vehicular cargo loader including a channel attached to the vehicle, a carriage slideably engaging the channel, and a winch attached to the carriage to move the carriage along the channel. The method further comprises transferring the cargo to the carriage, raising the carriage and cargo to an upper position, and transferring the cargo from the carriage to the vehicle roof. The method further comprises transporting the cargo on the vehicle roof from a first location to a second location and unloading the cargo from the vehicle roof at the second location.

In another embodiment, a vehicular cargo loader comprises a channel adapted to be attached to a vehicle and a carriage slideably engaging the channel. The vehicular cargo loader further comprises a winch attached to the carriage to move the carriage along the channel and rungs attached to the channel to form a ladder.

These and other embodiments of the present application will be discussed more fully in the description. The features, functions, and advantages can be achieved independently in various embodiments of the claimed invention, or may be combined in yet other embodiments.

BRIEF DESCRIPTION OF THE DRAWINGS

The accompanying drawings, which are incorporated in and constitute a part of this specification, illustrate exemplary embodiments of the present application.

Like reference numbers and designations in the various drawings indicate like elements.

DETAILED DESCRIPTION

In the following description, reference is made to the accompanying drawings that form a part thereof, and in which is shown by way of illustration specific exemplary embodiments in which the invention may be practiced. These embodiments are described in sufficient detail to enable those skilled in the art to practice the invention, and it is to be understood that modifications to the various disclosed embodiments may be made, and other embodiments may be utilized, without departing from the spirit and scope of the present invention. The following detailed description is, therefore, not to be taken in a limiting sense.

Figure 1:
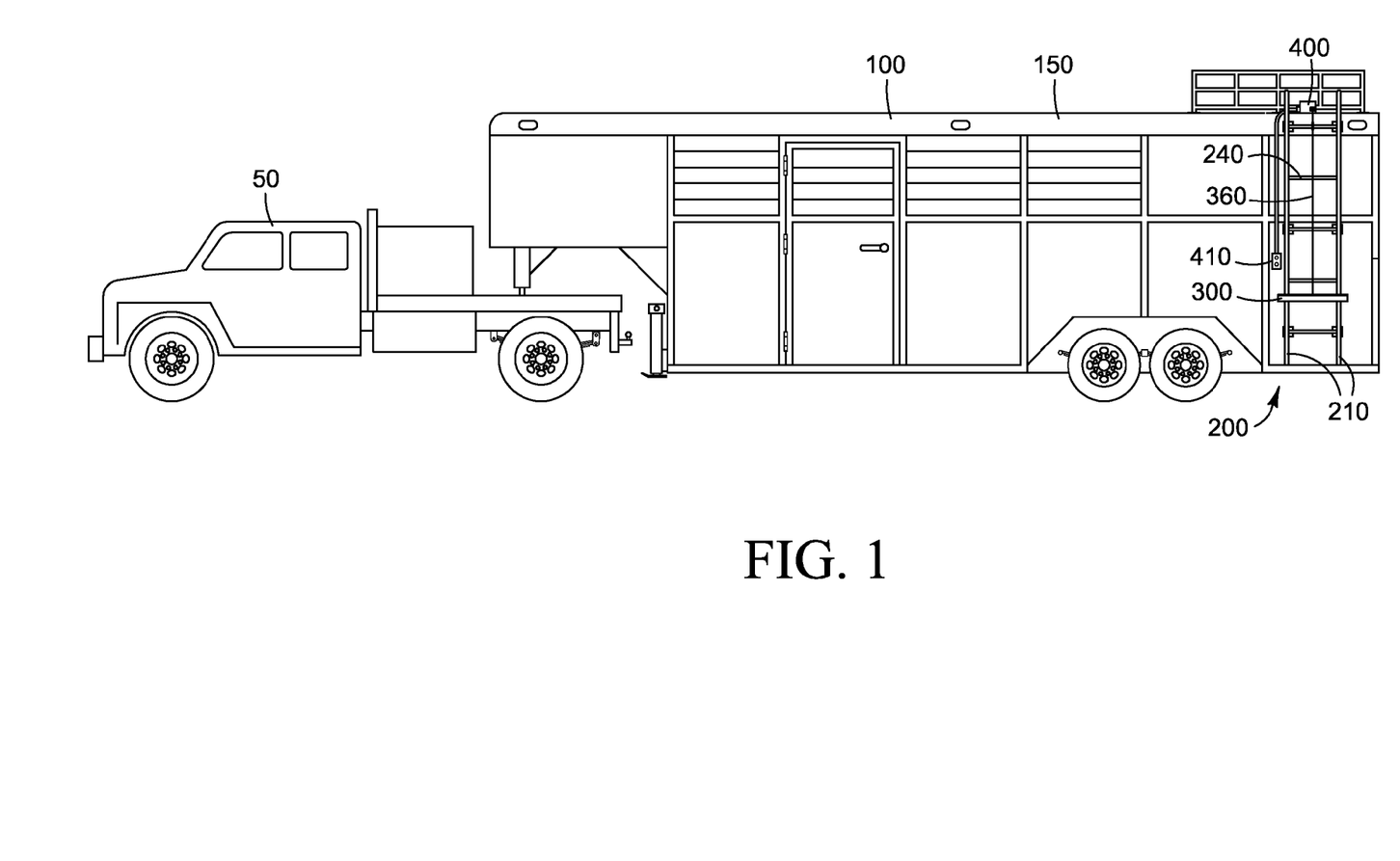
FIG. 1 illustrates one embodiment of a vehicular cargo loader attached to a vehicle.
Figure 2:
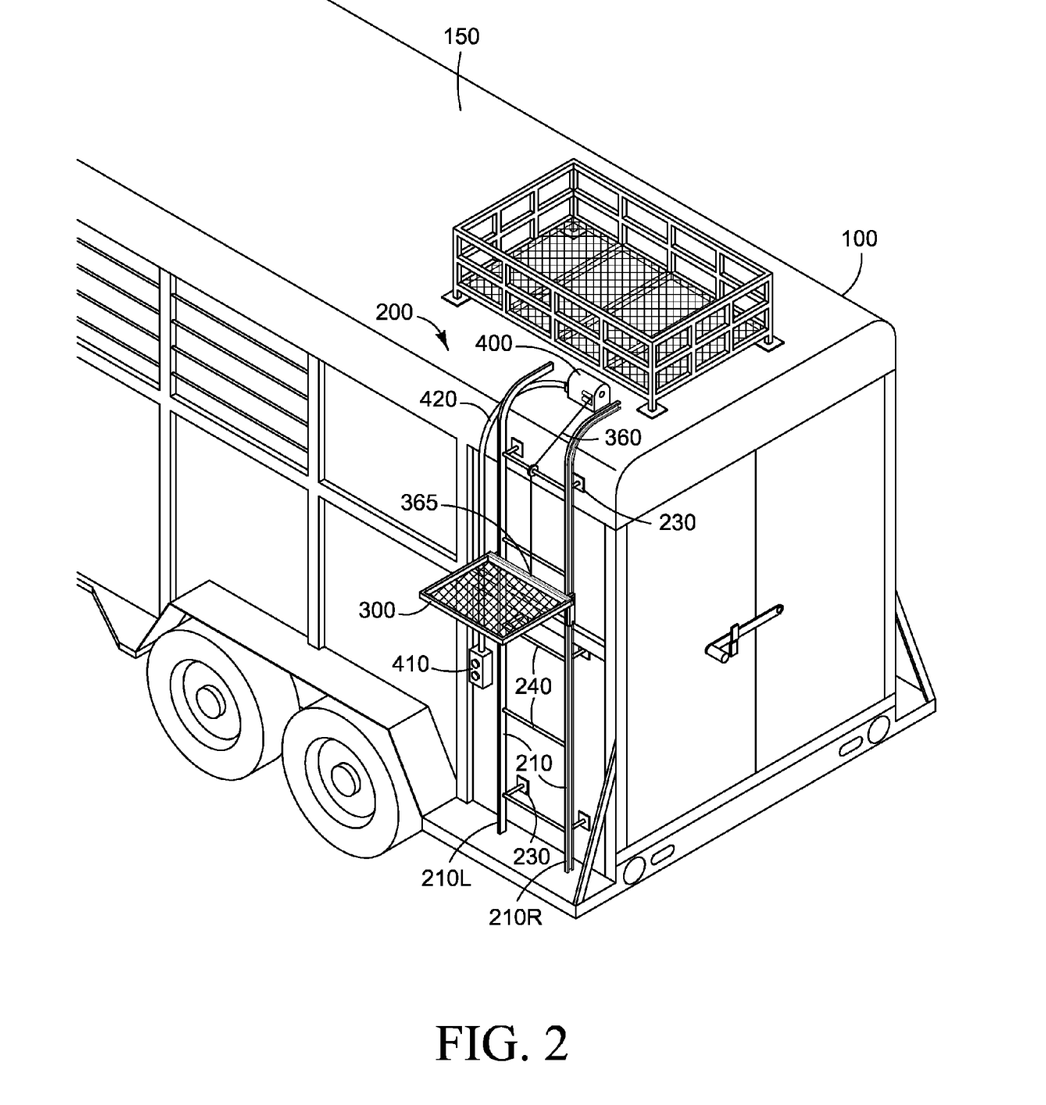
FIG. 2 illustrates an alternate view of the vehicular cargo loader shown in FIG. 1.

FIGS. 1 and 2 show one embodiment of a vehicular cargo loader 200 attached to a vehicle 100. In the illustrated embodiment, the vehicle 100 comprises a horse trailer configured to be towed by a tow rig 50, such as a pickup truck. In other embodiments, the vehicle 100 may comprise a wide variety of other vehicles used to transport cargo, such as, for example, a stock trailer, travel trailer, fifth wheel, recreational vehicle, motor home, camper, van, truck, sport utility vehicle, bus, boat, ship, train, etc. In some cases, the vehicle 100 is towed by a tow rig 50, as shown, whereas in other cases, the vehicle 100 is self-powered.

In the embodiment shown in FIG. 2, the loader 200 has two substantially vertical channels 210L and 210R attached to the vehicle 100 by attachments 230. In other embodiments, such as the embodiment shown in FIGS. 6A and 6B, described below, the loader 200 may comprise a single channel 210. The attachments 230 may comprise any suitable apparatus for attaching the channels 210 to the vehicle 100, such as, for example, screws, bolts, adhesives, hooks and eyes, etc. In some embodiments, the attachments 230 may comprise welded joints that permanently attach the channels 210 to the vehicle 100, or the channels 210 can be manufactured as an integral part of the vehicle 100 itself.

Referring again to the example shown in FIGS. 1 and 2, the loader 200 further comprises a carriage 300 slideably engaged with the channels 210 and a winch 400 that provides a motive force to move the carriage 300 along the channels 210. The loader 200 also comprises rungs 240 attached to the channels 210, forming a ladder for human access to the vehicle roof 150.

In the illustrated embodiment, the winch 400 comprises an electric cable winch, with a cable 360 attached to the carriage 300 via a cable attachment 365. In other embodiments, the winch 400 may comprise a wide variety of other suitable mechanisms for raising and lowering the carriage 300, such as, for example, a manual winch, pulley system, lead screw arrangement, pneumatic or hydraulic cylinder, electric motor, ratchet and lever mechanism, chain hoist, etc. Depending on the type of winch 400 utilized, the cable 360 may be replaced by an alternative component, such as a lead screw, piston rod or chain. In such cases, the cable attachment 365 is adapted to accommodate the selected winch mechanism.

In some embodiments, the winch 400 can be controlled with a remote winch control 410 in communication with the winch 400 via a suitable communication link 420, which can take a variety of forms, depending on the type of winch 400 utilized. For example, in the illustrated embodiment, the communication link 420 comprises a cord, whereas in other embodiments, the communication link 420 may comprise a wireless communication link, tension cable, pneumatic tube or hose, etc. The remote winch control 410 preferably enables a user to operate the winch 400 from a variety of locations, including the vehicle roof 150 or the ground.

In operation, the carriage 300 can be raised and lowered along the channels 210 to load and unload cargo from the vehicle roof 150. When the carriage 300 is at or near the upper end of the channels 210, as shown in FIG. 1, it is said to be in an upper position, at which cargo can be transferred from the carriage 300 to the vehicle roof 150, or from the vehicle roof 150 to the carriage 300. When the carriage 300 is at or near the lower end of the channels 210, as shown in FIG. 2, it is said to be in a lower position, at which cargo can be transferred to or from the carriage 300.

Figure 3:
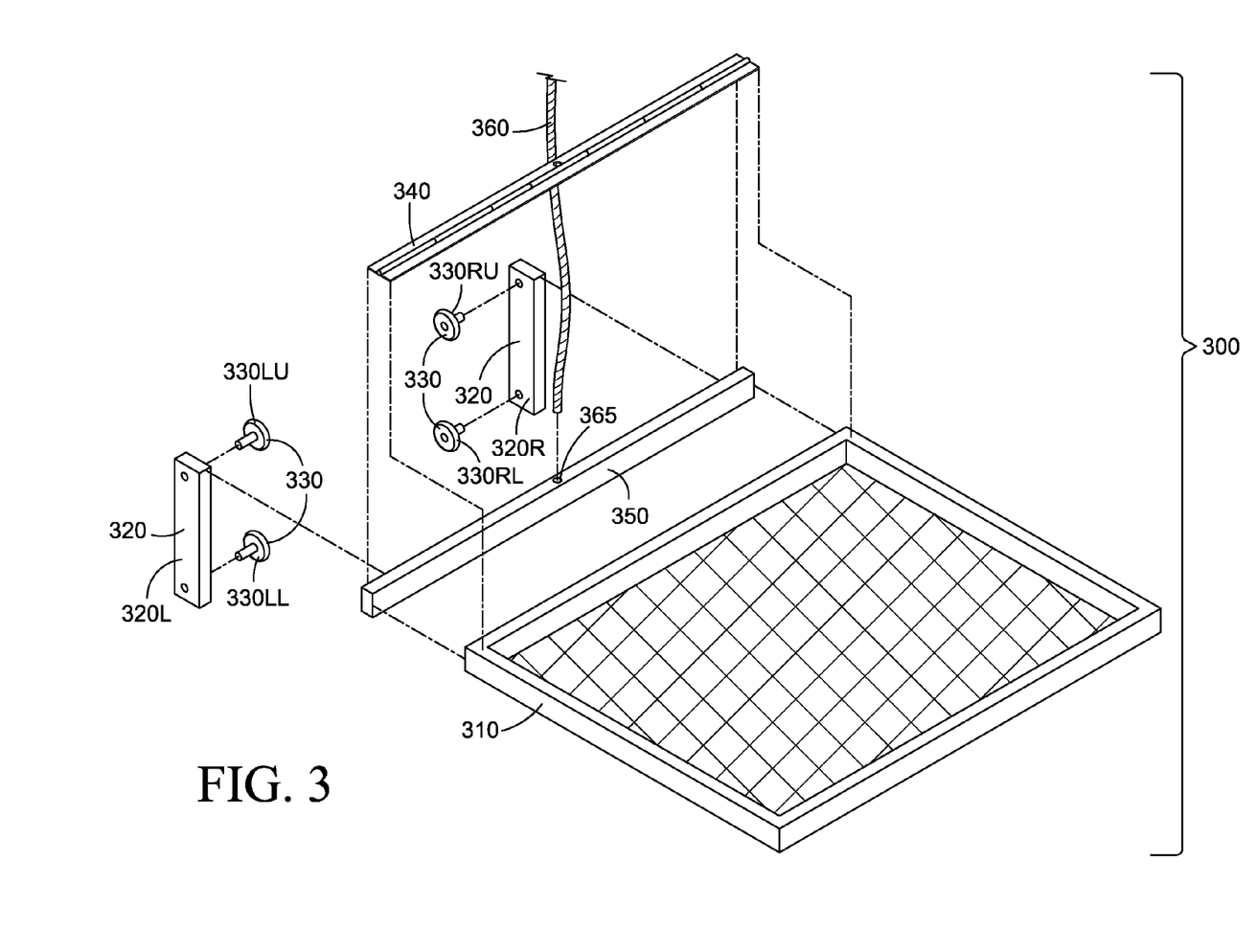
FIG. 3 illustrates the carriage assembly of the vehicular cargo loader shown in FIGS. 1 and 2.
Figure 4:
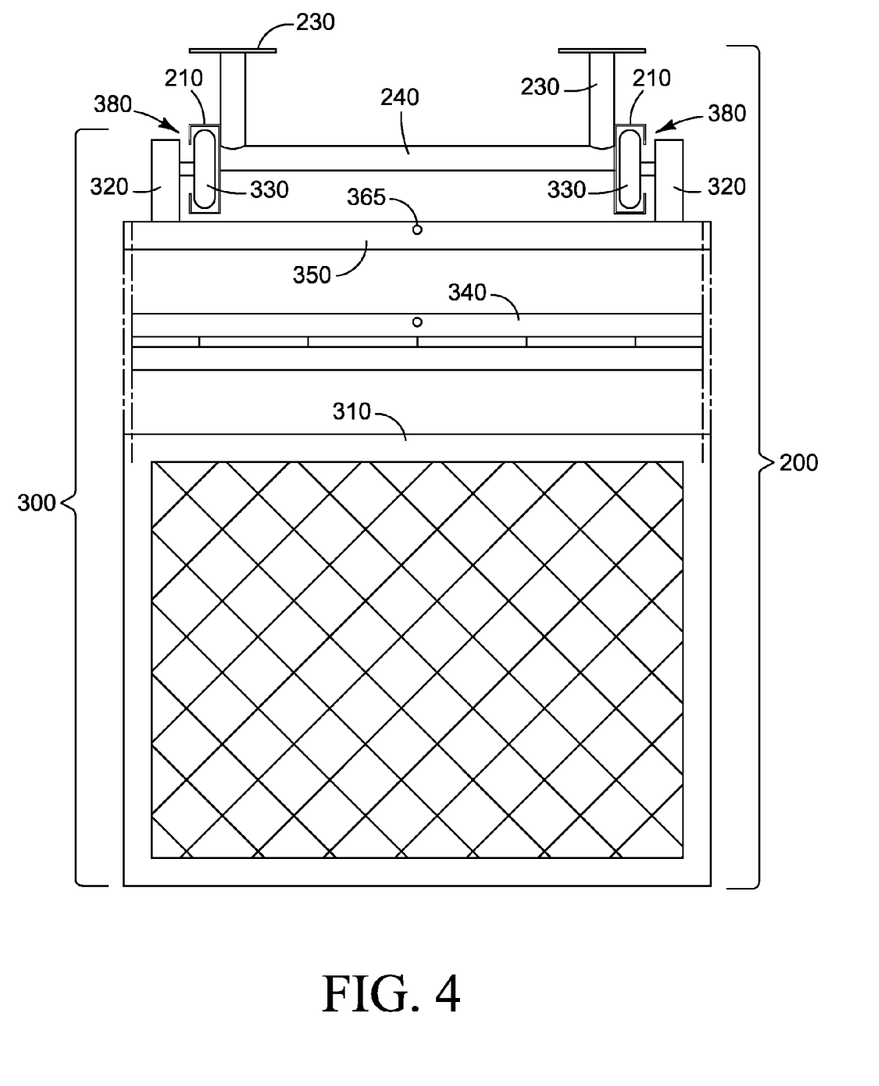
FIG. 4 illustrates an alternate view of the carriage assembly shown in FIG. 3.

FIGS. 3 and 4 show a detailed view of an exemplary embodiment of the carriage 300. In the illustrated embodiment, the carriage 300 comprises rollers 330LU, 330LL, 330RU, 330RL that are chosen to fit into the channels 210 of FIGS. 1 and 2. The rollers 330LU, 330LL attach to a carriage upright 320L on the left side of the carriage 300, and the rollers 330RU, 330RL attach to a carriage upright 320R on the right side of the carriage 300. Carriage uprights 320L and 320R attach to the left and right side of a carriage spine 350 respectively. In other embodiments, the carriage uprights 320L, 320R can be combined with the carriage spine 350 and can be formed from a single piece of material by casting, folding, stamping, bending or molding. Other methods and variations are possible.

In operation, the carriage uprights 320 and carriage spine 350 constrain the rollers 330 to slide or roll within the channels 210. The combination of the roller 330 in a channel 210 is called an engagement 380. The rollers 330 and channels 210 engage such that the rollers 330, and hence the carriage 300, are constrained to move along the long axis of the corresponding channel 210. Thus, the carriage 300 can be said to be slideably engaging the channel 210.

Referring again to FIGS. 3 and 4, the carriage 300 further comprises a carriage base 310 attached to the carriage spine 350. In the illustrated embodiment, the carriage base 310 comprises a general-purpose platform or frame which can support a wide variety of cargo types. In other embodiments, the carriage base 310 can be adapted for specific types of cargo with specialized or customized components, such as, for example, open boxes, boxes with lids, tines, hooks, nets, bicycle or motorcycle carriers, etc. For example, in one preferred embodiment, a specialized carriage 300 is designed to accommodate animal supplies such as hay bales, straw bales, animal bedding or feed. Such an adaptation is useful for dedicated vehicles such as horse trailers and stock trailers. In some cases, the carriage base 310 may comprise interchangeable, removable components, thereby enabling the loader 200 to accommodate different types of cargo at different times.

The carriage 300 and carriage base 310 may comprise any suitable material, such as, for example, steel, aluminum, fiberglass, carbon composites, plastic, etc. In the illustrated embodiment, the carriage base 310 is attached to the carriage spine 350 with a hinge 340. In other embodiments, the carriage base 310 may be permanently or removably attached to the carriage spine using a variety of other suitable mechanisms. If a hinge 340 is utilized, it may comprise a wide variety of hinge types, such as, for example, a piano hinge (as shown in FIGS. 3 and 4), pin and tube, strap hinge, door hinge, etc.

Figures 5A, 5B:
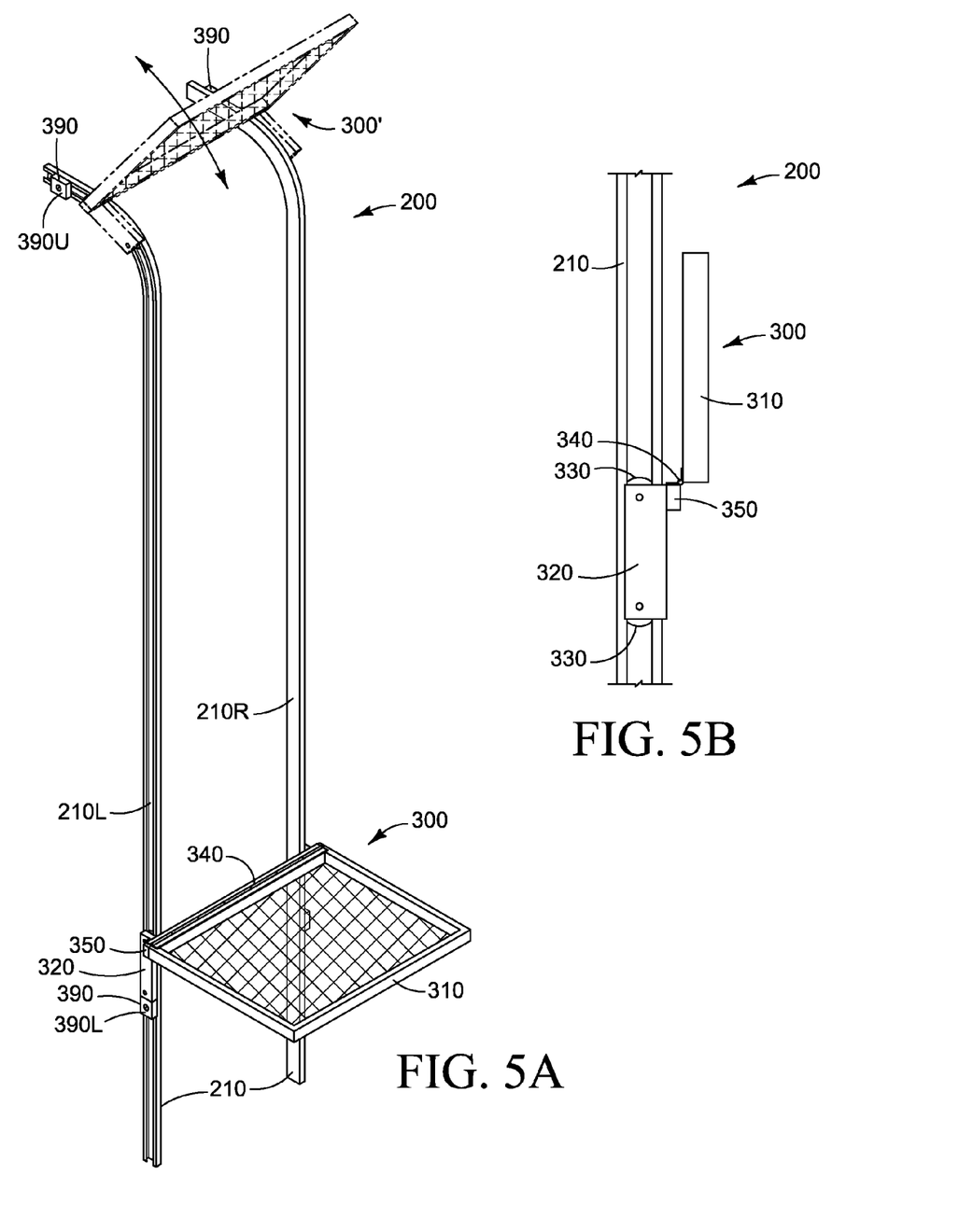
FIGS. 5A and 5B illustrate the carriage in a tilted position and stowed position.

FIG. 5A shows an embodiment of the loader 200 in which, when the carriage 300 is raised to the upper position, it can follow the curvature of the channels 210 into a tilting position, indicated as 300'. This tilting position can be useful for transferring cargo from the carriage 300 onto the vehicle roof 150 in some situations. For example, certain rugged types of cargo, such as hay or straw bales, can be tilted off of the carriage base 310 directly onto the vehicle roof 150. In such cases, a user can later ascend the rungs 240 to reposition the cargo, if desired. Conversely, for more delicate cargo, the user can limit upward motion of the carriage 300 to prevent the tilting of the cargo onto the vehicle roof 150. In such cases, the cargo can be manually transferred from the carriage 300 to the vehicle roof 150 (or vice versa) when the carriage 300 is in the upper position.

FIG. 5A illustrates limit stops 390U and 390L, which can be utilized to prevent the carriage 300 from traveling off of the ends of the channels 210. Limit stop 390U constrains carriage travel at the upper carriage position, while limit stop 390L constrains carriage travel at the lower carriage position. In some embodiments, the limit stops 390 comprise bolts or other obstructions in the channels 210 to block further motion of the rollers 330 and therefore the carriage 300. In other embodiments, the limit stops 390 can include switches or valves to halt the operation of the winch 400 when the carriage 300 has reached the end of allowable travel. For example, an upper electrical limit stop 390U can turn off the winch for any further upward movement but still enable downward movement. Conversely, a lower electrical limit stop 390L can turn off the winch for any further downward movement but still enable upward movement. Together, limit stops 390U and 390L constrain the carriage 300 to travel within prescribed regions of the channels 210.

In the embodiment illustrated in FIG. 5B, the carriage base 310 attaches foldably to the carriage spine 350 with the hinge 340. This enables the carriage base 310 to transition easily from a working position, as shown in FIG. 5A, to a folded or stowed position against the channels 210, as shown in FIG. 5B. In the working position, the carriage base 310 is capable of supporting cargo for loading and unloading from a vehicle roof 150, as described above. The stowed position allows the carriage base 310 to assume a smaller profile when the loader 200 is not in use. The stowed position is often particularly desirable when the vehicle 100 is in transit or located in a narrow place, such as a garage or barn.

Figure 6A:
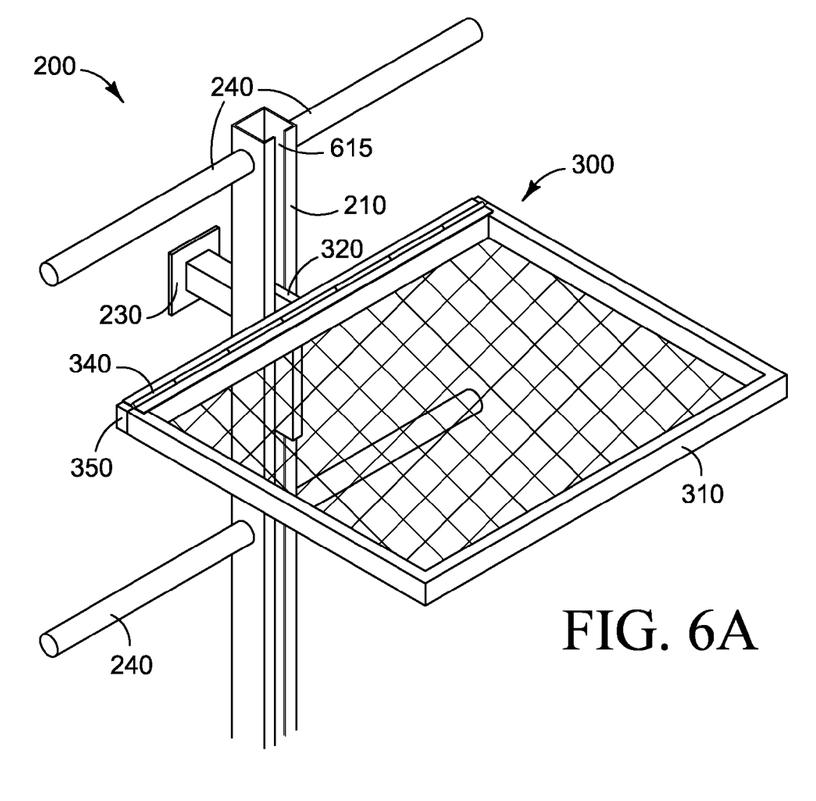
FIGS. 6A and 6B illustrate an embodiment of the vehicular cargo loader using a single channel.
Figure 6B:
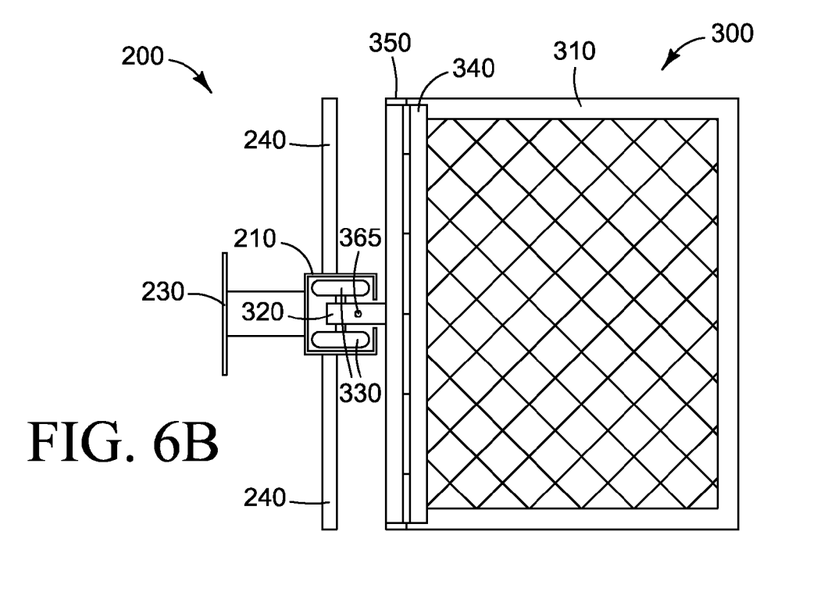

FIG. 6 illustrates an embodiment of the loader 200 with a single channel 210, which can be attached to a vehicle 100 using attachments 230 in a manner similar to that described above with reference to FIGS. 1 and 2. In the illustrated embodiment, the channel 210 comprises a square tube with a slot 615 along one side. Although the channel 210 is depicted as square in shape, other shapes, open or closed, are possible. Examples include I-beams or tubes with rectangular, round or asymmetrical cross-sections. In the embodiment shown in FIG. 6, ladder rungs 240 are attached to the channel 210 to form a ladder for human access to the vehicle roof 150. The rungs 240 can attach to either the left, right or both sides of the channel 210.

The carriage 300 further comprises a single carriage upright 320 attached to a pair of rollers 330 that ride inside the channel 210 while part of the upright 320 passes through the slot 615. The portion of the carriage upright 320 protruding through the slot 615 carries the weight of the carriage base 310 via the carriage spine 350 and hinge 340. In other embodiments, the rollers 330 can be replaced by a low-friction material, such as polyethylene, which can attach to the carriage upright 320 and slide inside the channel 210. In such embodiments, the motion of the carriage 300 may operate similarly to drapery rods that have sliding plastic inserts captured inside the channel of the drapery rod. Those skilled in the art can design a suitable roller 330 or low-friction material arrangement to enable motion of the carriage 300 along the axis of the selected channel type. For example, FIG. 6B depicts an embodiment in which the cable attachment 365 is located on the carriage upright 320 rather than the carriage spine 350, as shown in FIG. 3.

Figure 7:
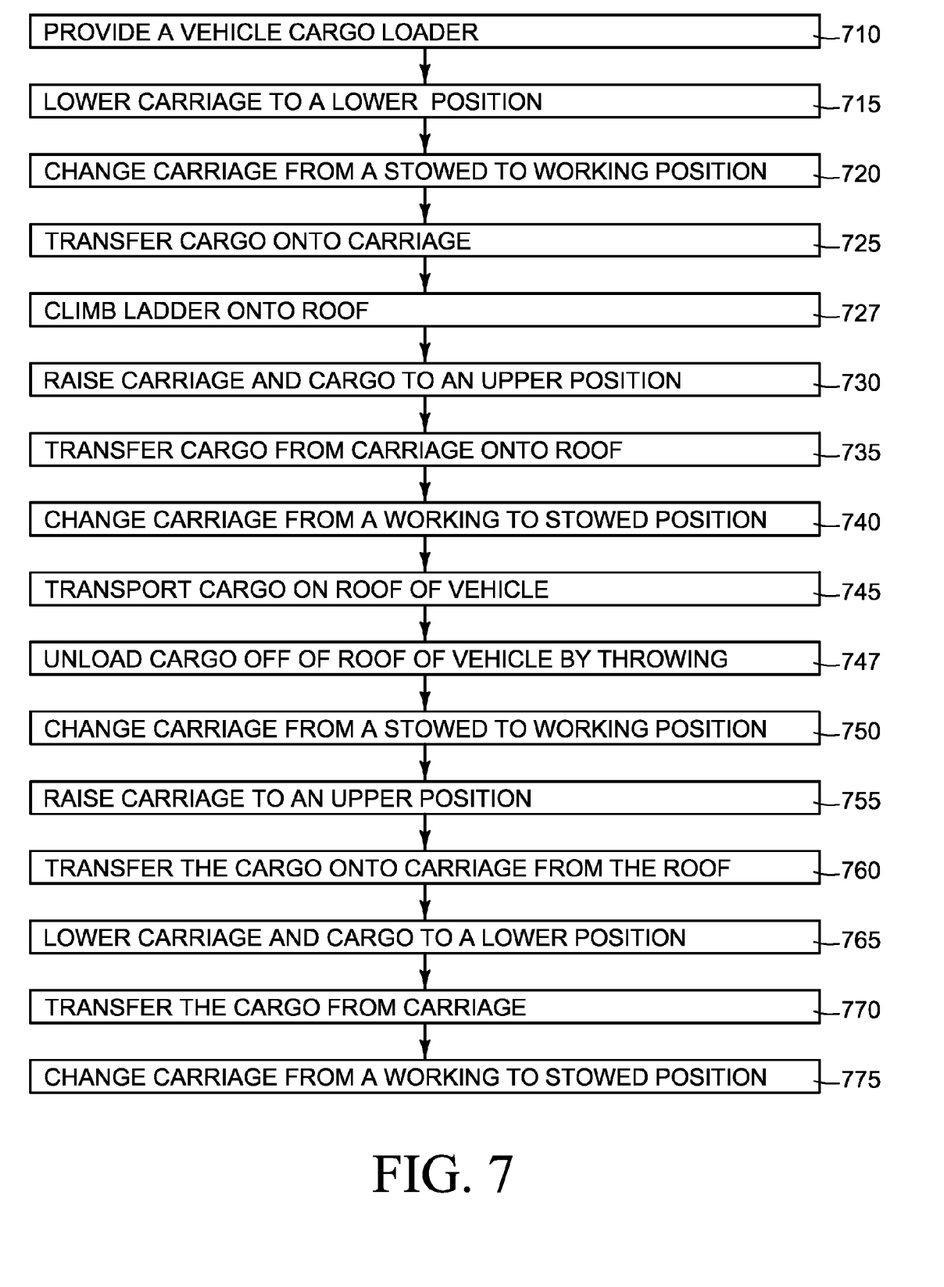
FIG. 7 is a flow chart outlining the use of a vehicular cargo loader.

The flow chart of FIG. 7 outlines the use of the loader 200. At 710 the user provides a vehicle 100 and loader 200 at a first location. At 715 the user lowers the carriage 300 to a lower position (if necessary). At 720 the user changes the carriage 300 from a stowed position to a working position (if necessary). At 725 the user transfers the cargo onto the carriage 300.

At 727 the user can climb onto the vehicle roof 150 using the ladder formed by rungs 240, if desired. At 730 the user raises the carriage 300 and cargo with the winch 400 to an upper position. As described above, the user can preferably operate the winch 400 from a variety of locations, including the vehicle roof 150 or the ground. At 735 the user transfers the cargo from the carriage 300 onto the vehicle roof 150. As described above, this transfer can take place by tilting the cargo onto the vehicle roof 150 or by manually transferring the cargo by hand from the carriage 300 to the vehicle roof 150.

In preparation for travel, the user can change the carriage 300 from a working position to a stowed position at 740, if desired. At 745 the user transports the cargo on the vehicle roof 150 from the first location to a second location or destination. At the second location, the user can unload cargo with or without the loader 200. For example, the user may unload certain rugged cargo, such as hay or straw bales, simply by throwing the cargo off the vehicle roof 150 to the ground at 747. For more delicate cargo, the user can utilize the loader 200, if desired.

At 750 the user moves the carriage 300 from a stowed position to a working position (if necessary). The user then raises the carriage 300 to an upper position at 755 (if necessary). At 760 the user transfers the cargo from the vehicle roof 150 to the carriage 300. The user then lowers the carriage 300 and cargo to a lower position at 765. At 770 the user transfers the cargo from the carriage 300 to the ground or another desired location, such as, for example, a hand truck or another vehicle. When all the cargo has been unloaded the user can return the carriage 300 to the stowed position at 775, if desired. The various operations shown in FIG. 7 can be performed in any suitable order and can be repeated to load or unload cargo from the vehicle roof 150.

The loader 200 described above exhibits many advantages over conventional cargo loading systems and methods. For example, the loader 200 can easily load and unload a wide variety of cargo types from virtually any vehicle roof 150. The loader 200 also advantageously reduces the human effort and risk required to load and unload cargo from a vehicle roof 150. In addition, the loader 200 does not involve excessive set up and tear down, and is simple and quick to use by one person.

Although this invention has been described in terms of certain preferred embodiments, other embodiments that are apparent to those of ordinary skill in the art, including embodiments that do not provide all of the features and advantages set forth herein, are also within the scope of this invention. Rather, the scope of the present invention is defined only by reference to the appended claims and equivalents thereof.

What is claimed is:

1. A vehicle with a vehicular cargo loader comprising:
    a channel fixedly attached to the vehicle;
    a carriage slideably engaging the channel;
    a winch connected to the carriage to move the carriage along the channel; and
    rungs attached to the channel to form a ladder.
2. The vehicle of claim 1, wherein the vehicle comprises a horse trailer, stock trailer, travel trailer, fifth wheel, recreational vehicle, motor home, camper, van, truck, sport utility vehicle, bus, boat, ship, or train.
3. The vehicle of claim 1, wherein the winch comprises an electric cable winch, manual winch, pulley system, lead screw arrangement, pneumatic or hydraulic cylinder, electric motor, ratchet and lever mechanism, or chain hoist.
4. The vehicle of claim 1, further comprising limit stops arranged to constrain motion of the carriage within prescribed regions of the channel.
5. The vehicle of claim 1, wherein the carriage comprises:
    rollers constrained to move within the channel;
    carriage uprights attached to the rollers;
    a carriage spine attached to the carriage uprights;
    a carriage base for supporting the cargo; and
    a hinge foldably attaching the carriage spine and carriage base, thereby enabling the carriage base to have a stowed position and a working position.
6. The vehicle of claim 5, wherein the channel has a substantially vertical longitudinal axis whether the base is in the stowed position or the working position.
7. The vehicle of claim 1, wherein the longitudinal axis of the channel is substantially vertical.
8. A method for transporting cargo on a vehicle roof, the method comprising:

providing a vehicular cargo loader attached to the vehicle, the vehicular cargo loader including a channel attached to the vehicle, a carriage slideably engaging the channel, and a winch connected to the carriage to move the carriage along the channel;

transferring the cargo to the carriage;

raising the carriage and the cargo to an upper position;

transferring the cargo from the carriage to the vehicle roof;

transporting the cargo on the vehicle roof from a first location to a second location; and unloading the cargo from the vehicle roof at the second location.

9. The method of claim 8, further comprising changing the carriage from a stowed position to a working position prior to transferring the cargo to the carriage.

10. The method of claim 8, further comprising changing the carriage from a working position to a stowed position after transferring the cargo from the carriage.

11. The method of claim 8, further comprising changing the carriage from a working position to a stowed position prior to transporting the cargo.

12. The method of claim 8, wherein unloading the cargo comprises:

raising the carriage to an upper position;

transferring the cargo to the carriage from the vehicle roof;

lowering the carriage and cargo to a lower position; and transferring the cargo from the carriage.

13. The method of claim 8, wherein unloading the cargo comprises throwing the cargo off the vehicle roof.

14. The method of claim 8, wherein the cargo comprises animal supplies.

15. A vehicular cargo loader comprising:

a channel adapted to be attached to a vehicle, the channel having a substantially vertical longitudinal axis when attached to the vehicle;

a carriage slideably engaging the channel;

a winch connected to the carriage to move the carriage along the channel; and rungs attached to the channel to form a ladder.

16. The vehicular cargo loader of claim 15, wherein the vehicle comprises a horse trailer, stock trailer, travel trailer, fifth wheel, recreational vehicle, motor home, camper, van, truck, sport utility vehicle, bus, boat, ship, or train.

17. The vehicular cargo loader of claim 15, wherein the winch comprises an electric cable winch, manual winch, pulley system, lead screw arrangement, pneumatic or hydraulic cylinder, electric motor, ratchet and lever mechanism, or chain hoist.

18. The vehicular cargo loader of claim 15, further comprising limit stops, arranged to constrain motion of the carriage within a prescribed region of the channel.

19. The vehicular cargo loader of claim 15, wherein the carriage further comprises:

rollers constrained to move within the channel;

carriage uprights attached to the rollers;

a carriage spine attached to the carriage uprights;

a base for supporting the cargo; and a hinge foldably attaching the carriage spine and carriage base enabling the base to assume a stowed position and a working position.

* * * * *